Jan. 30, 1968   P. L. MAY ET AL   3,366,036
BALING MECHANISM
Filed July 13, 1966                5 Sheets-Sheet 5

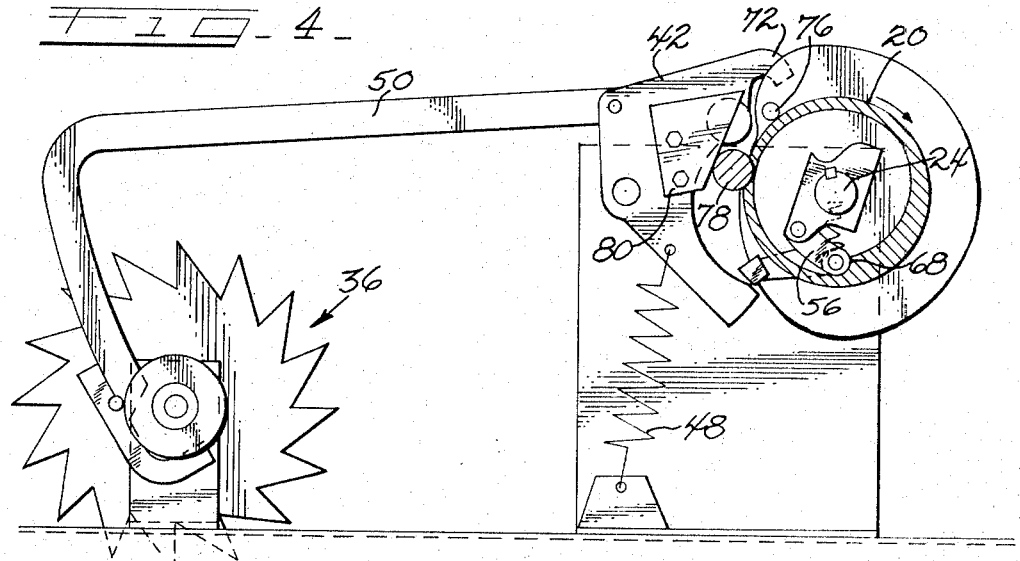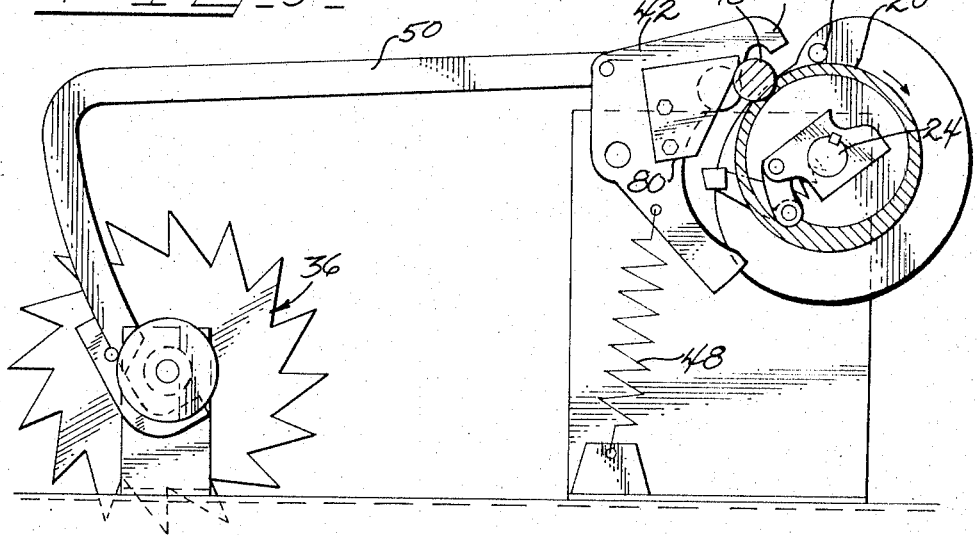

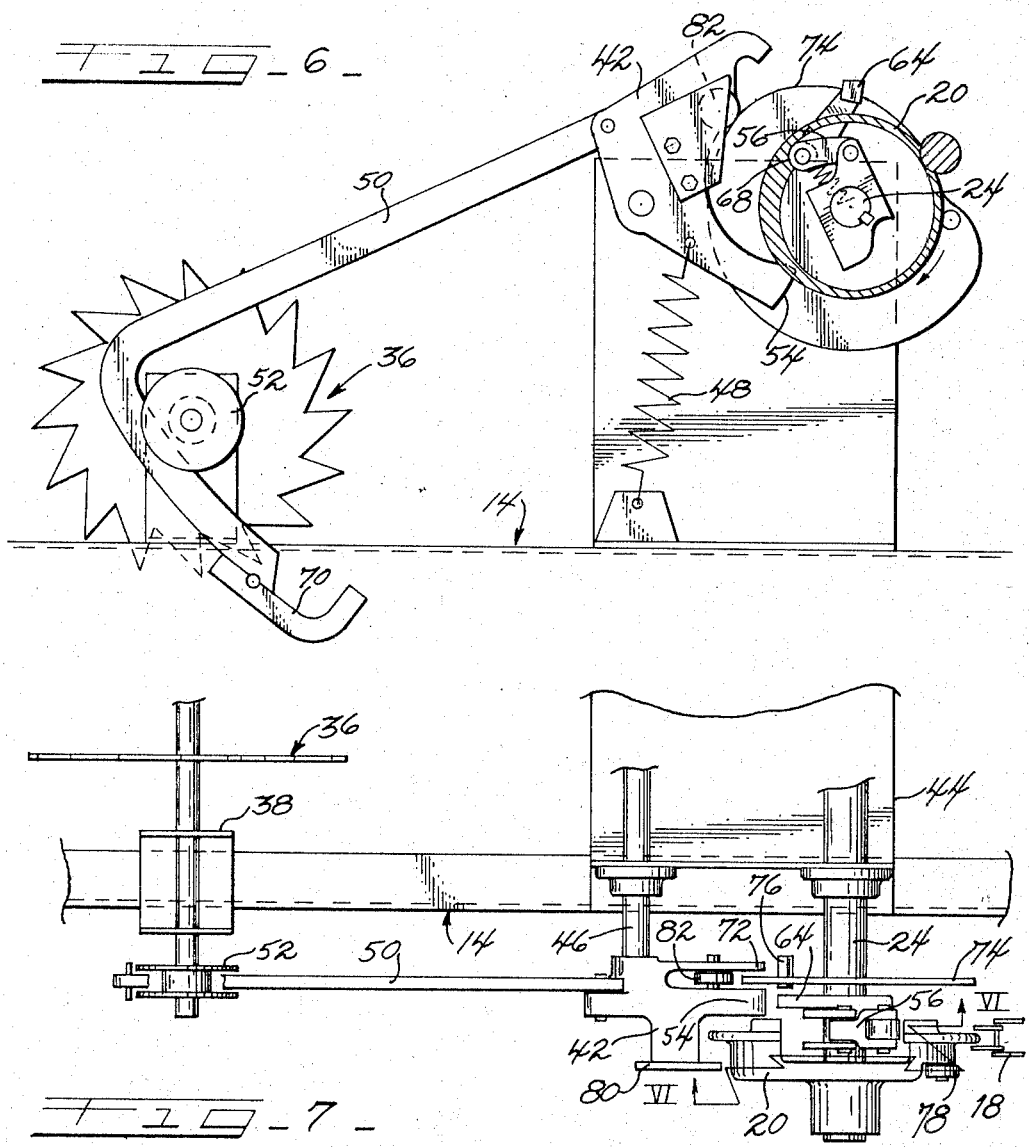

INVENTORS
PATRICK L. MAY
FENTON L. KENNA, JR.
BY
Richard E. Baskam
ATT'Y.

United States Patent Office 3,366,036
Patented Jan. 30, 1968

3,366,036
BALING MECHANISM
Patrick L. May and Fenton L. Kenna, Jr., Memphis, Tenn., assignors to International Harvester Company, Chicago, Ill., a corporation of Delaware
Filed July 13, 1966, Ser. No. 564,893
8 Claims. (Cl. 100—4)

This invention relates to automatic hay baling machines and more particularly relates to a novel device to prevent premature drift of the needle into the bale forming chamber of a baling machine.

In conventional hay baling machines a frequent complaint is that the needles delivering the twine or wire to knotter devices often drift into the bale forming chamber out of timed relationship with the plunger and are damaged when struck by hay being pushed ahead of the plunger. Among the reasons for this is the fact that the knotter drive shaft brake which normally holds the needles in place is not 100% efficient. This means that the brake may slip when the baler encounters a sudden jolt, thus allowing the needles to prematurely drift into the bale forming chamber. Another reason would be that sufficient rotational drag may exist in the journal bearing between the knotter shaft and drive sprocket to overcome the brake and cause the needles to drift.

Conventional balers are also provided with a plunger stop mechanism which is designed to move into the path of the plunger when the needles prematurely drift into the bale chamber. When this occurs the plunger would strike the plunger stop ahead of the needles and shear a safety bolt in the plunger drive which then interrupts plunger movement. However, if the needles drift into the chamber after the plunger has moved past the stop, or if the stop becomes inoperative for some reason, then the needles will be damaged. Even when the plunger stop operates to protect the needles it is troublesome and time consuming to discontinue the baling operation for replacement of the safety bolt.

Accordingly, it is an object of the present invention to provide a positive stop to prevent premature drift of the needle into the bale forming chamber of a baling machine.

Another object is to provide a device for protecting the needles of a baling machine having a one revolution clutch for engaging and disengaging a driving member with a driven member in which the driven member operates the knotters and pivots the needles into the bale forming chamber, wherein the device includes a detent mechanism to lock the driven member until the driving member and plunger are correctly positioned for the tying cycle.

Still another object is to provide a safety device to prevent needle drift in an automatic baling machine having a trip dog clutch actuated by a trip arm to drive a knotter shaft through one revolution wherein the device includes a locking member on the trip arm holding the knotter shaft from turning until just before the driving member is in position to engage the trip dog clutch.

These and other objects of the present invention will become apparent to those skilled in the art when the following specification is read in conjunction with the accompanying drawings, wherein:

FIGURE 4 is a view similar to FIGURE 3 illustrating unlocking of the knotter shaft from the trip arm with the trip dog assembly in driving connection with the driving member;

FIGURE 5 is a view similar to FIGURE 4 illustrating a position of the driving member prior to resetting of the trip arm;

FIGURE 6 is a view similar to FIGURE 5 illustrating the trip arm and trip rod in the reset position with a section view of the driving member taken along the line VI—VI of FIGURE 7; and FIGURE 7 is a top plan view of the drive mechanism of FIGURE 6;

Figure 1:
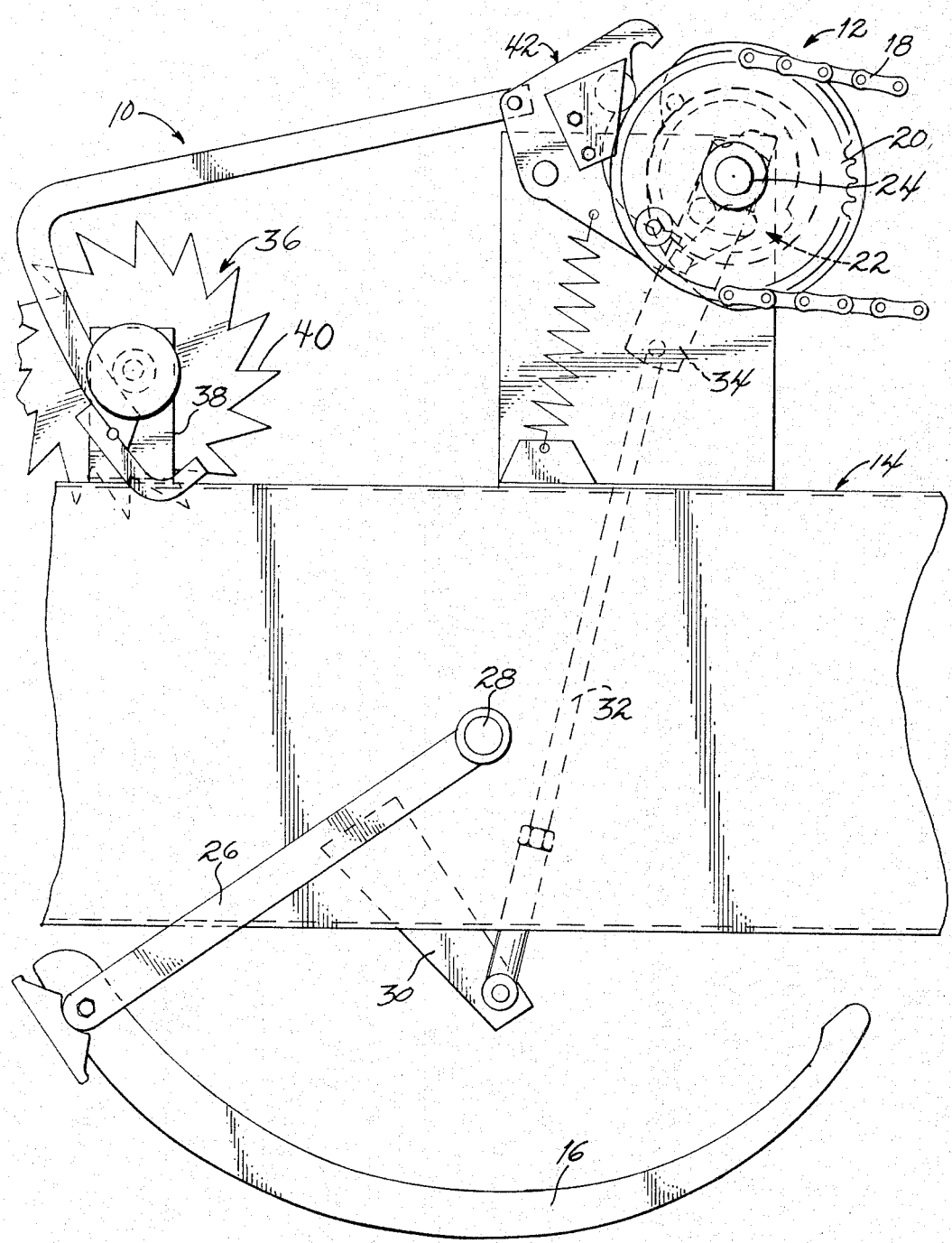
FIGURE 1 is a side elevation view of a portion of an automatic baling machine incorporating a drive mechanism embodying features of the present invention.

Referring now to the drawings and particularly FIGURE 1 a portion of an automatic baling machine is illustrated generally at 10. The baling machine 10 includes a knotter mechanism 12 mounted above a longitudinally extending bale forming chamber 14. A conventional plunger (not shown) is mounted within the chamber on the right side and reciprocates to compress hay while simultaneously moving the compressed hay to the left. The knotter mechanism operates intermittently responsive to movement of a predetermined amount of hay through the chamber to tie strands of twine or wire around the compressed hay to form a bale. Upon initiation of the knotting cycle a pair of transversely spaced needles 16 pivot upwardly to feed the twine or wire to the knotter mechanism. It is important that movement of the needles into the chamber be precisely timed with operation of the knotter mechanism and plunger to prevent damage to the needles. Thus, the needles must enter the chamber at the end of the plunger compression stroke so that they will freely pass through vertical slots provided in the plunger. Where the needles drift into the chamber out of timed relationship with the plunger the hay pushed ahead of the plunger will strike and damage the needles.

The knotter mechanism 12 and needles 16 are powered by a prime mover (not shown) through a drive chain 18 trained over drive sprocket 20. A one-revolution clutch 22 engages and disengages the drive sprocket with a knotter shaft 24. The conventional knotter parts are driven by shaft 24 and are not shown for purposes of clarity.

The pair of needles 16 are pivotally mounted on the bale forming chamber by means of arms 26 and pins 28. An extension 30 of an arm 26 is connected with a link 32 which in turn is connected with a crank arm 34 on the knotter shaft. During clockwise rotation of drive sprocket 20, and upon engagement of clutch 22, the crank arm 34 will rotate to pivot the needle 16 upward through slots (not shown) provided in the bottom of chamber 14.

Actuation of the one revolution clutch is initiated through operation of a conventional bale length metering wheel assembly 36. The metering wheel assembly is rotatably mounted on bracket 38 at the top of chamber 14 and is provided with a plurality of teeth 40 which extend downwardly through a slot in the chamber to engage the hay. Upon movement of a predetermined amount of hay to the left through the chamber the metering wheel assembly will operate trip arm 42 to engage clutch 22.

Drive sprocket 20 is driven clockwise by the drive chain at a constant speed throughout the baling operation. Sprocket 20 is sectioned in FIGURES 2 through 6 along the line VI—VI of FIGURE 7. Each of the FIGURES 2 through 6 illustrate a serial position of the drive sprocket during a knotting cycle.

Figure 2:
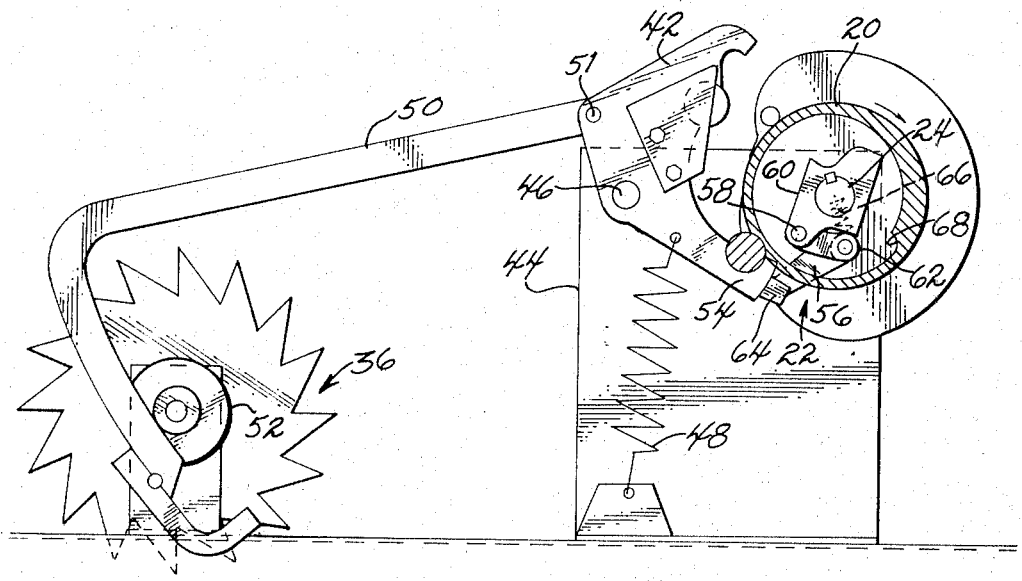
FIGURE 2 is a side elevation view similar to FIGURE 1 with the drive chain and a portion of the drive sprocket removed for clarity and with the trip arm and trip dog assembly in the disengaged position.

Clutch 22 is normally in the disengaged position as illustrated in FIGURE 2. The clutch is engaged through actuation of trip arm 42 which is pivotally mounted on knotter drive frame 44 by means of pin 46 and is biased in a clockwise direction by tension spring 48. An L-shaped trip rod 50 is in frictional engagement at one end with sheave 52 of the metering wheel assembly and is pivotally connected at its other end with the trip arm through pin 51 to counteract the force of spring 48. A downwardly projecting stop member 54 provided on the trip arm functions to actuate the clutch.

Clutch 22 is conventional and comprises a trip dog assembly 56 which may be of the type disclosed in Patent No. 2,634,840, issued to J. H. Bornzin, assignor to International Harvester Company. The trip dog assembly is pivotally mounted at 58 to a trip dog carrier 60 keyed to knotter shaft 24. The trip dog assembly includes a roller 62 and is provided with a lug 64 projecting around drive sprocket 20 into releasable contact with trip arm stop member 54. A compression spring 66 pivots the trip dog assembly outwardly so that a driving lug 68 provided on the drive sprocket engages roller 62 to drive the knotter shaft. In the disengaged position as illustrated in FIGURE 2 stop member 54 holds trip dog assembly 56 inwardly so that roller 62 is out of contact with the driving lug 68. In this position operation of the knotter mechanism and needles is normally prevented by means of a frictional brake (not shown) normally provided at the opposite end of knotter shaft 24.

In FIGURE 2 the bale of hay has moved sufficiently to rotate the metering wheel clockwise so that sheave 52 has moved trip rod 50 upwardly just prior to the trip position.

Figure 3:
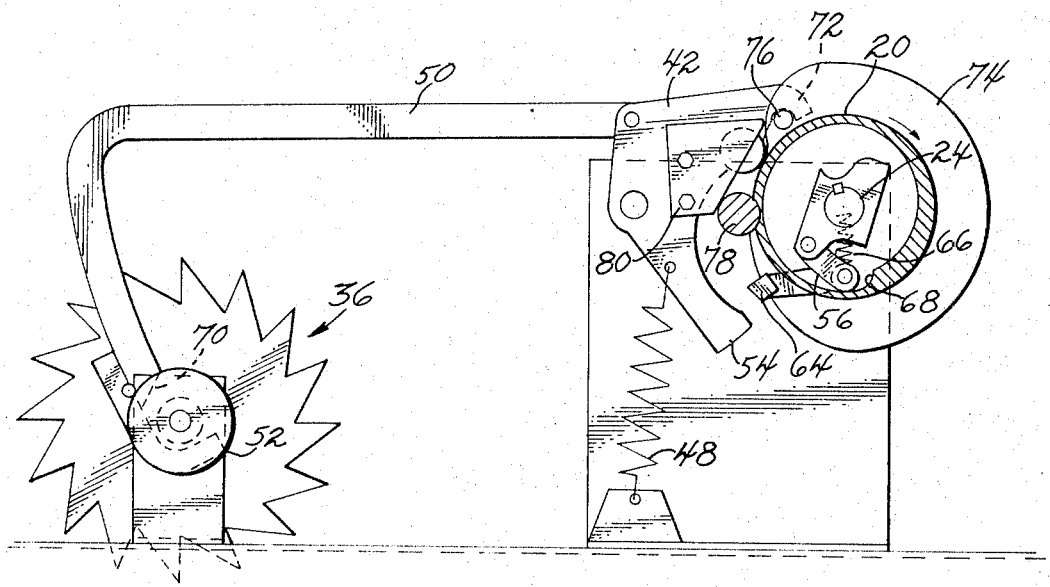
FIGURE 3 is a view similar to FIGURE 2 illustrating pivoting of the trip arm for positive locking of the knotter shaft upon release of the trip dog assembly.

FIGURE 3 illustrates the next stage of the baling cycle in which the metering wheel has rotated further to permit notch 70 of trip rod 50 to fall into a groove in sheave 52. Spring 48 will now pivot trip arm 42 clockwise so that stop member 54 moves out of engagement with lug 64 of the trip dog assembly. Spring 66 will now pivot the trip dog assembly into the driving position. However, at this time the driving lug 68 may be almost 360 degrees away from the driving position where it would engage the trip dog assembly. Because the constantly rotating drive sprocket 20 is in timed relationship with the plunger, the plunger would also be out of phase with the knotter drive. Premature operation of the knotters and needles is restrained by means of the knotter shaft brake, but a sudden jolt to the machine may cause the brake to slip with the result that the inertia of the needles will carry them prematurely into the chamber.

To prevent this from occurring a locking means is provided to hold the knotter shaft in position until just before driving lug 68 engages trip dog assembly 56. In the preferred embodiment of this invention the locking means comprises a locking projection or latch 72 formed at the upper end of the trip arm. A reset cam 74 is keyed to knotter shaft 24 and is provided with a lock pin 76. As shown in FIGURE 7 lock pin 76 axially extends behind reset cam 74 in registry with the locking projection of the trip arm. After the trip arm has pivoted to release the trip dog assembly, and before the driving lug engages roller 62, the locking projection will move into engagement with the lock pin to prevent rotation of the knotter shaft.

The locking means is automatically disengaged just prior to engagement of the driving lug with the trip dog assembly. This function is provided by operating means including a disengaging roller 78 mounted on the drive sprocket. A disengaging cam plate 80 is secured to the trip arm in registry with the disengaging roller. In the position of the mechanism illustrated in FIGURE 3 the roller 78 has just made contact with the camming surface of cam plate 80 to initiate disengagement of the locking projection from the lock pin.

In the position illustrated in FIGURE 4 the drive sprocket has rotated further and driving lug 68 has contacted trip dog assembly 56 to initiate drive of the knotter shaft. The disengaging roller 78 has now moved against cam plate 80 and pivoted the trip arm and locking projection counterclockwise to complete the disengagement of the locking means and release of the knotter shaft. The sprocket 20 will now drive the knotter shaft through one complete revolution and thereby operate the knotting mechanism through one cycle and simultaneously pivot the needles into the baling chamber.

FIGURE 5 illustrates a subsequent position of the drive sprocket and knotter shaft where lock pin 76 has rotated beyond the locking projection 72. The disengaging roller 78 is ready to move from cam plate 80 prior to resetting of the trip arm.

FIGURE 6 illustrates further rotation of the drive sprocket to a position in which trip arm 42 is reset for subsequent disengagement of the trip dog assembly. To provide this function a reset roller 82 is mounted on trip arm 42 in registry with reset cam 74 (FIGURE 7). As the reset cam rotates against the reset roller, trip arm 42 will pivot counterclockwise against the bias of spring 48. The trip arm in turn operates trip rod 50 so that notch 70 on the rod moves out of engagement with sheave 52. The metering wheel assembly 36 will now retain the trip rod and trip arm in the position illustrated in FIGURE 6 until movement of the hay through chamber 14 initiates another knotting cycle.

After the drive sprocket and knotter shaft have rotated an additional one-half turn from the position of FIGURE 6 the stop member 54 will contact lug 64 to disengage the trip dog assembly from driving lug 68. This disengages knotter shaft 24 from the drive sprocket and terminates operation of the knotter mechanism and needles.

Figure 8:
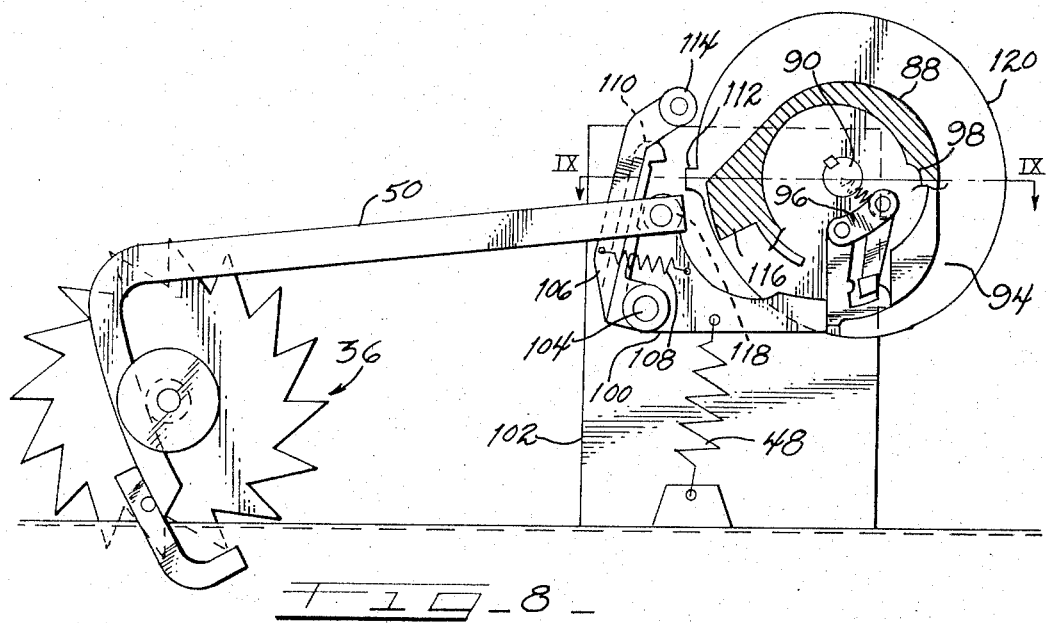
FIGURE 8 is a side elevation view of a modified form of the present invention.
Figure 9:
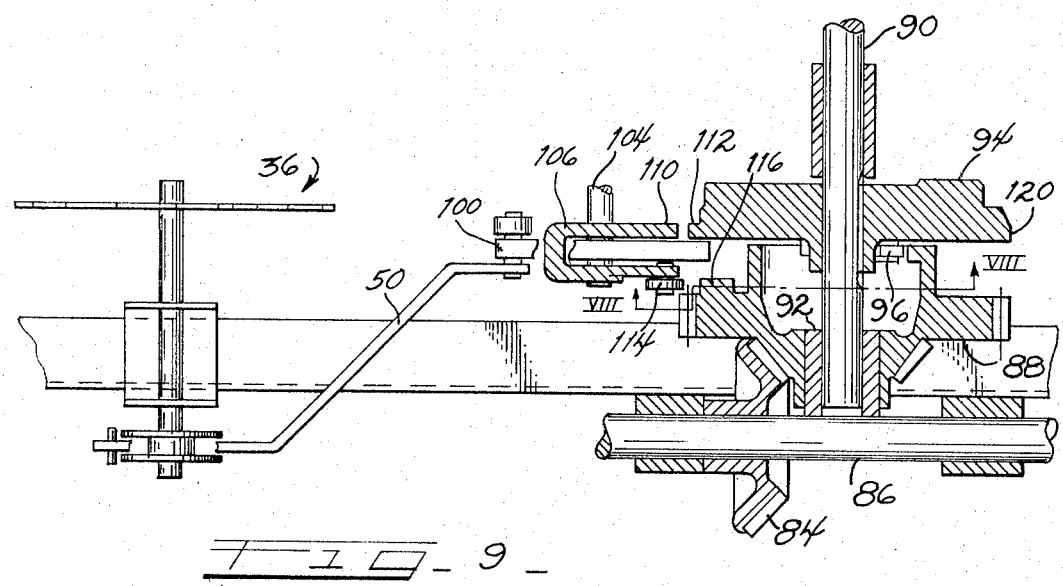
FIGURE 9 is a top plan view of the modification of FIGURE 8 showing elements of the drive train in cross-sectional view taken along the line IX—IX of FIGURE 8.

FIGURES 8 and 9 illustrate an embodiment of the invention including a modification of the locking means. As illustrated in FIGURE 9 the input drive is supplied through a miter gear 84 keyed to the packer crankshaft 86. The gear 84 is in driving engagement with a knotter drive gear 88. A knotter shaft 90 is rotatably mounted at one end within drive gear 88 by means of journal bearing 92. A trip dog carrier 94 is keyed to knotter shaft 90, and a conventional trip dog assembly 96 is mounted on carrier 94 within knotter drive gear 88. A driving lug 98 formed on the drive gear operates the trip dog assembly in the conventional manner.

The metering wheel 36 and trip rod 50 are positioned in the conventional manner above the baling chamber. A trip arm 100 is mounted on the knotter frame 102 by means of pivot pin 104.

The modification to the locking means comprises a yoke 106 pivotally mounted at one end to the trip arm by means of pin 104. The yoke is biased against the trip arm by means of tension spring 108. One arm of the yoke is provided with a locking projection or latch 110 registry with a locking lug 112 formed on the trip arm carried 94. A cam roller 114 is mounted on the other arm of yoke 106. The roller 114 is in registry with a disengaging cam 116 formed on knotter drive gear 88. A reset roller 118 is mounted on the trip arm in registry with reset cam 120 formed integral with carrier 94.

Operation of the modification of FIGURES 8 and 9 is similar to that explained above in connection with FIGURES 1 through 7. Thus, after the metering wheel assembly and trip rod actuate the trip arm to release the trip dog assembly to the driving position, the locking projection 110 will engage locking lug 112 to prevent rotation of knotter shaft 90 until just before knotter drive gear 88 is in position to engage the trip dog assembly. At this time disengaging cam 116 will move against cam roller 114 to release locking projection 110 from lug 112. After drive gear 88 has driven knotter shaft 90 so that lug 112 has moved from under projection 110 reset cam 120 will move against cam roller 118 is pivot trip arm 100 counterclockwise into position to disengage trip dog assembly 96 from drive lug 98.

It will be understood that various changes in the details and arrangement of parts, which have been described and illustrated in order to explain the nature of the invention, may be made by those skilled in the art within the principle and scope of the invention as expressed in the appended claims.

What is claimed is:

1. A device for use with an automatic baling machine having a plunger reciprocating between compression and return strokes within a bale forming chamber, a driving member rotating in timed relationship with movement of the plunger, a knotter mechanism, a needle to feed tying strands to the knotter mechanism, a driven member operatively connected with the knotter mechanism and needle, a one revolution clutch assembly for engaging and disengaging the driving member with the driven member, and a trip arm movable from a first position disengaging the clutch to a second position engaging the clutch, the device comprising: lock means to prevent rotation of the driven member; and, operating means to release the lock means responsive to movement of the driving member to a predetermined position wherein the needle enters the chamber substantially at the end of the plunger compression stroke.

2. The invention as defined in claim 1 wherein: the lock means comprises a detent on the trip arm adapted to releasably engage the driven member upon movement of the trip arm to the second position.

3. The invention as defined in claim 2 wherein: the operating means comprises a cam integral with the driving member, the cam being adapted to release the detent substantially at the end of the plunger compression stroke.

4. The invention as defined in claim 1 wherein: the driving member includes a driving lug; the clutch assembly includes a trip dog assembly biased from a disengaged position to an engaged position connecting the lug in driving engagement with the driven member; and, the trip arm in the first position operates the trip dog assembly to the disengaged position.

5. The invention as defined in claim 4 wherein: the lock means comprises a detent on the trip arm adapted to releasably engage the driven member upon movement of the trip arm to the second position.

6. The invention as defined in claim 5 wherein: the operating means comprises a cam integral with the driving member, the cam being adapted to engage the trip arm for releasing the detent just prior to driving engagement of the lug by the trip dog assembly.

7. The invention as defined in claim 4 wherein: the detent comprises a lever pivotally connected at one end to the trip arm and having a latch at its other end, the lever being biased against the trip arm whereby the latch releasably engages the driven member when the trip arm is in the second position.

8. The invention as defined in claim 7 wherein: the operating means comprises a cam integral with the driving member, the cam being adapted to engage and pivot the lever with respect to the trip arm to release the latch from the driven member.

References Cited

UNITED STATES PATENTS

| | | | |
|---|---|---|---|
| 2,620,724 | 12/1952 | Berry | 100—4 |
| 2,634,840 | 4/1953 | Bornzin | 100—4 XR |
| 2,807,996 | 10/1957 | Barnes et al. | 100—4 |
| 2,911,904 | 11/1959 | Weiss | 100—4 |
| 3,129,654 | 4/1964 | Locker et al. | 100—4 |

BILLY J. WILHITE, *Primary Examiner.*